(12) United States Patent
DeSorbo et al.

(10) Patent No.: US 6,779,932 B2
(45) Date of Patent: Aug. 24, 2004

(54) SHOE AND MOUNT ASSEMBLY TO HOLD CAMERA OR CAMCORDER

(75) Inventors: Alexander P. DeSorbo, Woodbury, CT (US); Carl A. Hultman, Derby, CT (US); Joseph P. Teodosio, Seymour, CT (US)

(73) Assignee: Anton/Bauer, Inc., Shelton, CT (US)

(*) Notice: Subject to any disclaimer, the term of this patent is extended or adjusted under 35 U.S.C. 154(b) by 20 days.

(21) Appl. No.: 10/431,911

(22) Filed: May 8, 2003

(65) Prior Publication Data

US 2004/0146293 A1 Jul. 29, 2004

Related U.S. Application Data

(60) Provisional application No. 60/441,365, filed on Jan. 21, 2003.

(51) Int. Cl.$^7$ .................................. G03B 17/00
(52) U.S. Cl. ....................... 396/419; 396/428
(58) Field of Search .................. 396/419, 428

(56) References Cited

U.S. PATENT DOCUMENTS

| | | | |
|---|---|---|---|
| 3,612,462 A | * 10/1971 | Mooney et al. | 248/316.4 |
| 4,929,973 A | * 5/1990 | Nakatani | 248/177.1 |
| 5,260,731 A | 11/1993 | Baker, Jr. | |
| 5,890,025 A | 3/1999 | Hart | |
| 6,119,398 A | 9/2000 | Yates, Jr. | |
| 6,234,690 B1 | * 5/2001 | Lemieux | 396/419 |

* cited by examiner

Primary Examiner—David M. Gray
(74) Attorney, Agent, or Firm—Allen D. Brufsky

(57) ABSTRACT

A shoe mount assembly configured for use with a variety of cameras or camcorders. The shoe is attached to the bottom of the camera or camcorder unit. The shoe is detachable and is dimensioned to center fit a corresponding indent in the top surface of the mount. The shoe is configured with a locating pin and a threaded connector to be fitted on the base of a camera or camcorder. Once the locating pin locates the receiving recess in the bottom of the camcorder, the shoe is secured in place by the threaded connector. The shoe is loaded into the mount and locked in place by releasing a spring biased camlock for interaction with a cam surface on the shoe.

9 Claims, 2 Drawing Sheets

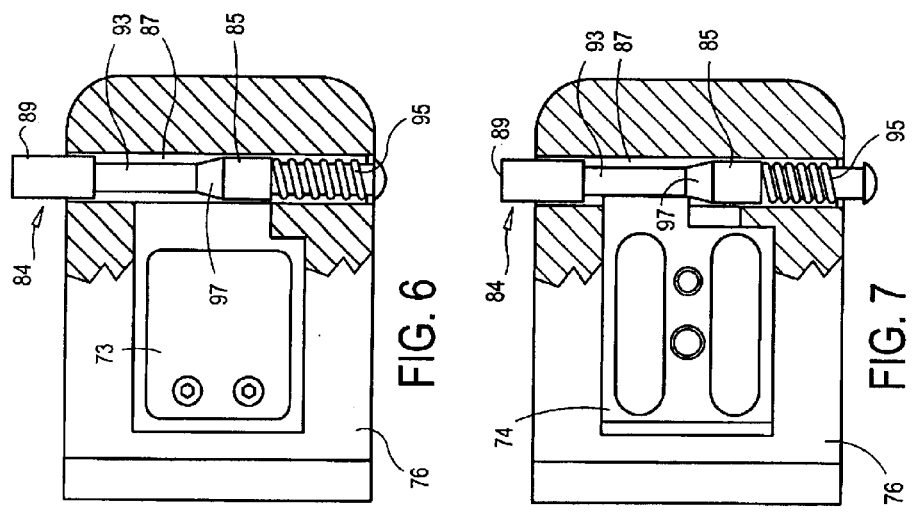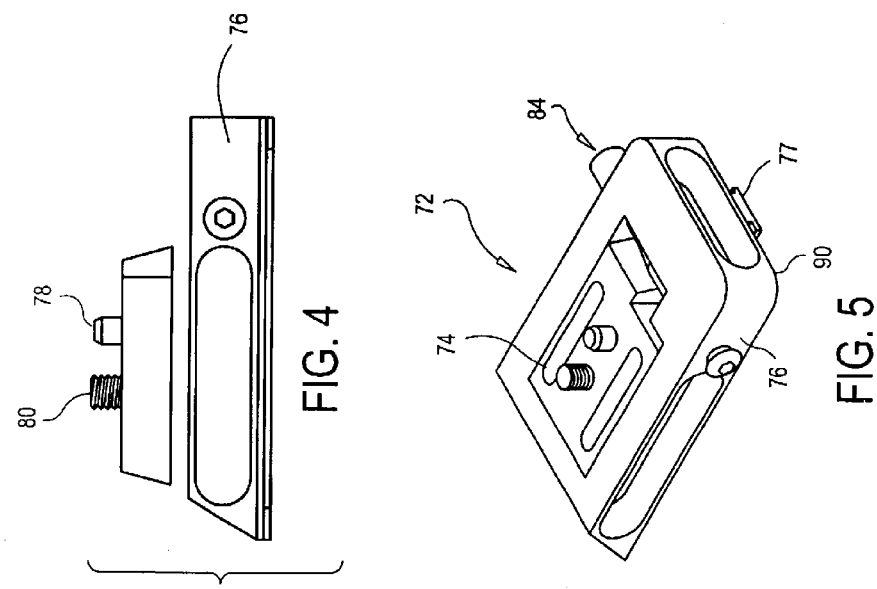

SHOE AND MOUNT ASSEMBLY TO HOLD CAMERA OR CAMCORDER

CROSS-REFERENCES TO RELATED APPLICATION

This application claims the priority date of U.S. Provisional Application Ser. No. 60/441,365, filed Jan. 21, 2003.

BACKGROUND OF THE INVENTION

1. Field of the Invention

The present invention relates to a shoe and mount assembly to hold a camera or a camcorder on an auxiliary stabilizing device and support.

2. Description of the Prior Art

There have been various attempts to mount cameras or camcorders on auxiliary carrying and stabilizing devices using a shoe on the camera connected to a mount on the auxiliary device, such as illustrated in U.S. Pat. Nos. 5,260,731 and 5,890,025. However, either such devices provide for limited relative adjustment of the shoe and camera, or are unstable, permitting unwanted relative movement.

SUMMARY OF THE INVENTION

According to this invention, a shoe and mount assembly is configured for use with a variety of cameras or camcorders as the shoe is in mating engagement with the bottom of the camera or camcorder unit. The shoe is detachable and is dimensioned to center fit a corresponding indent in the top surface of the mount. The shoe is configured with a locating pin and a threaded connector to be fitted on the base of a camera or camcorder. Once the locating pin locates the receiving recess in the bottom of the camcorder, the shoe is secured in place by the threaded connector. This assembly provides for the quick release or connection of the camera or camcorder.

The shoe is loaded into the mount and locked in place by releasing a spring biased camlock for interaction with a cam surface on the shoe. A channel-shaped-groove is provided on the base of the mount for engagement with a complementary perpendicular channel-shaped-groove on an auxiliary device for adjusting the position of the mount and shoe assembly (and thus, camera or camcorder) on the auxiliary device, such as a shoulder harness, in a horizontal plane.

BRIEF DESCRIPTION OF THE DRAWINGS

Further objectives and advantages of the invention will become more apparent from the following description and claims, and from the accompanying drawings, wherein:

FIG. 4 is an exploded side view of the shoe and mount assembly.

FIG. 5 is a perspective view of the shoe and mount assembly.

FIG. 6 is a view similar to FIG. 3 with portions broken away to show in section the position of the camlock in the mount before insertion of the shoe.

FIG. 7 is a top plan view of the shoe and mount assembly with portions broken away to show in section the position of the camlock when the shoe is locked in the mount.

DETAILED DESCRIPTION OF THE PREFERRED EMBODIMENT

Figure 3:
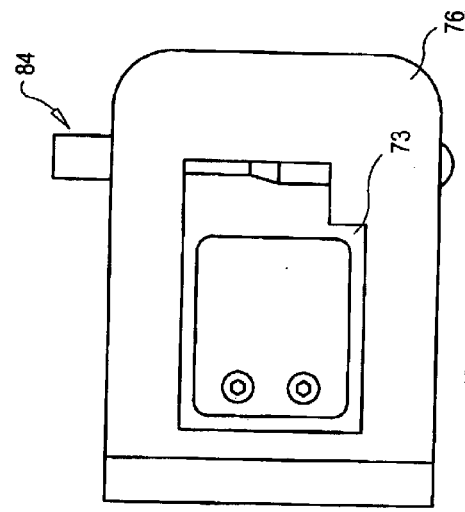
FIG. 3 is a top plan view of the mount.
Figure 2:
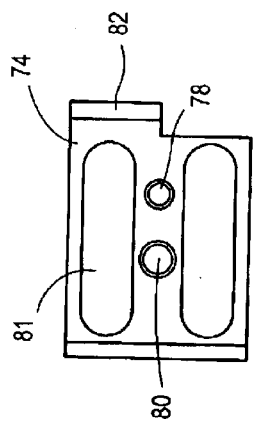
FIG. 2 is a top plan view of the individual shoe.
Figure 1:
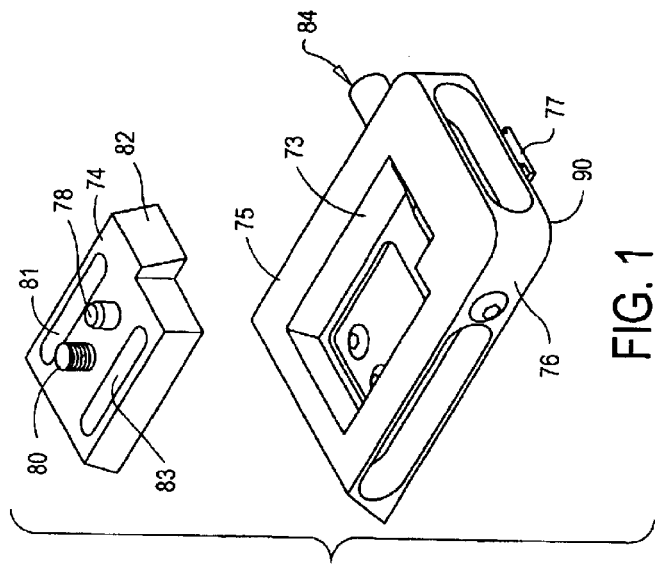
FIG. 1 is an exploded perspective view of the shoe and mount assembly according to the present invention.

Referring now to the drawings in detail, wherein like numerals indicate like elements throughout the several views. FIG. 1 is a perspective view of the shoe and mount assembly 72. The shoe and mount assembly 72 is configured for the shoe 74 to be connected to the bottom of a camcorder or camera, as shown in our co-pending application, Ser. No. 10/432,912, entitled "Shoulder Mounted Support Assembly to Hold Camera or Camcorder" assigned to the same assignee as the instant application, and filed concurrently herewith. The bottom of the mount can be attached to an auxiliary device, e.g., a shoulder harness for stabilizing the camera or camcorder, which is also shown in our co-pending application, which disclosure is incorporated herein by reference. As seen in FIG. 4, the shoe 74 is detachable and is dimensioned to center fit a corresponding L-shaped indent 73 in the top surface 75 of the mount 76. The shoe 74 is configured with a locating pin 78 to be placed in a an aperture (not shown) in the bottom of the camera or camcorder so as to enable a threaded connector 80 to be threadedly connected into a threaded receiving recess (not shown) in the bottom of the camera or camcorder 11. The top surface 82 of the shoe has abrasion pads 81, 83 for frictional engagement with the bottom of the camera.

Once assembled to the camera or camcorder the shoe 74 may be loaded into the mount 76 and retained in position by a spring biased camlock 84. The camlock 84 includes a spring-biased pin 85 held captive within a slot 87 as shown in FIGS. 6 and 7. Pushing inward on the head 89 of pin 85 against the bias of spring 95 as shown in FIG. 6 positions an undercut or thinner diameter portion 93 of the pin 85 adjacent to the projecting cam surface 82 of shoe 74 so the shoe can be positioned wholly within recess 73. Release of head 89 enables a thicker beveled portion 97 of the pin shaft or body to abut a portion of downwardly angled cam surface 82 to lock the shoe against upward removal, as shown in FIG. 7.

The base of the mount 76 has a T-shaped in cross-section bar 77 along its bottom surface 90 which is connected to a horizontal slide assembly which is mounted on a bracket on a camcorder or camera (not shown), to perfect the alignment of the camcorders or camera's viewfinder relative to the operator's eye using sliding adjustments in the X and Y directions in a horizontal plane as shown in our copending application.

We claim:

1. A shoe and mount assembly for use between a camera or camcorder and an auxiliary device to mount the camera or camcorder on the device, comprising:

a shoe for connection to a camera or camcorder.

a mount for connection to an auxiliary device having an indent receiving said shoe in seating engagement, and cam means between said shoe and said mount for locking said shoe to said mount in said indent, wherein said cam means includes a spring biased pin on said mount having a reduced diameter portion intermediate its opposite ends adapted to overlie an angled cam surface on said shoe when said pin is retracted and then released.

2. The assembly of claim 1 wherein the top surface of said shoe includes a threaded fastener for mounting said shoe on said camera.

3. The assembly of claim 2 wherein the top surface of said shoe includes a locating pin for locating the threaded fastener on said camera or camcorder.

4. The assembly of claim 3 where the bottom of said mount includes a T-shaped in cross-section slide component for mounting said assembly on an auxiliary device.

5. A shoe adapted to be mounted on a camera or camcorder and on a mount of an auxiliary device for holding the camera or camcorder, comprising:

cam means for locking said shoe to said mount, said cam means including a spring-biased pin on said mount having a reduced diameter portion intermediate its opposite ends adapted to overlie an angled cam surface on said shoe when said pin is retracted and then released.

6. The shoe of claim 5, wherein the top surface of said shoe includes a threaded fastener for mounting said shoe on said camera or camcorder.

7. The shoe of claim 6, wherein the top surface of said shoe includes a locating pin for locating the threaded fastener on said camera or camcorder.

8. A mount on an auxiliary device for holding a camera or camcorder adapted to co-act with a shoe on a camera or camcorder to mount the camera or camcorder on an auxiliary device, comprising:

cam means for locking said mount to said shoe, said cam means including a spring-biased pin on said mount having a reduced diameter portion intermediate its opposite ends adapted to overlie an angled cam surface on said shoe when said pin is retracted and then released.

9. The mount of claim 8, wherein the bottom of said mount includes a T-shaped in cross-section slide component for mounting said assembly on an auxiliary device.

* * * * *